United States Patent
Zhu et al.

(10) Patent No.: US 8,032,146 B2
(45) Date of Patent: Oct. 4, 2011

(54) RADIO RESOURCE MANAGEMENT IN MULTIHOP RELAY NETWORKS

(75) Inventors: Chenxi Zhu, Gaithersburg, MD (US);
Wei-Peng Chen, Santa Clara, CA (US);
Jonathan Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 11/830,935

(22) Filed: Jul. 31, 2007

(65) Prior Publication Data
US 2008/0188231 A1    Aug. 7, 2008

Related U.S. Application Data

(60) Provisional application No. 60/822,861, filed on Aug. 18, 2006, provisional application No. 60/822,791, filed on Aug. 18, 2006.

(51) Int. Cl.
*H04W 72/00* (2009.01)

(52) U.S. Cl. ........... 455/450; 455/7; 455/11.1; 455/447; 455/451; 455/452.1; 455/452.2; 455/453; 455/446; 455/509; 370/230; 370/230.1; 370/331; 370/338; 370/341; 370/348; 370/412; 370/413

(58) Field of Classification Search ............... 455/450, 455/451, 452.1, 452.2, 453, 9, 11.1, 7, 10, 455/13.1, 464, 41.2, 16, 444, 446, 447, 509; 370/42–418

See application file for complete search history.

(56) References Cited

U.S. PATENT DOCUMENTS

| | | | | |
|---|---|---|---|---|
| 5,034,993 A * | 7/1991 | Sasuta et al. | ...................... | 455/7 |
| 5,446,733 A * | 8/1995 | Tsuruoka | ...................... | 370/232 |
| 6,347,226 B1 * | 2/2002 | Virtanen | ...................... | 455/450 |
| 6,477,367 B1 * | 11/2002 | Kim | ...................... | 455/423 |
| 6,876,668 B1 * | 4/2005 | Chawla et al. | ............... | 370/468 |
| 6,917,580 B2 * | 7/2005 | Wang et al. | .................. | 370/203 |
| 7,069,009 B2 * | 6/2006 | Li et al. | ...................... | 455/446 |
| 7,079,859 B2 * | 7/2006 | Nobukiyo et al. | ............ | 455/522 |
| 7,194,017 B2 * | 3/2007 | Hervey et al. | .............. | 375/132 |
| 7,218,891 B2 * | 5/2007 | Periyalwar et al. | ......... | 455/13.1 |
| 7,349,665 B1 * | 3/2008 | Zhu et al. | .................... | 455/11.1 |
| 7,545,744 B2 * | 6/2009 | Zeitak | ........................ | 370/230.1 |
| 7,664,504 B2 * | 2/2010 | Bishop | ......................... | 455/446 |
| 2002/0137517 A1 * | 9/2002 | Williams et al. | ............. | 455/444 |
| 2002/0176361 A1 * | 11/2002 | Wu et al. | ...................... | 370/231 |
| 2003/0007456 A1 * | 1/2003 | Gupta et al. | ................. | 370/232 |

(Continued)

FOREIGN PATENT DOCUMENTS

KR    10-2004-0028445    4/2004

OTHER PUBLICATIONS

Form PCT/ISA/237—Written Opinion of the International Searching Authority issued Jul. 15, 2008 in International Application No. PCT/US07/74865 (4 pages).

(Continued)

*Primary Examiner* — Olumide T Ajibade Akonai
(74) *Attorney, Agent, or Firm* — Staas & Halsey LLP (57) ABSTRACT

The embodiments balance wireless communication bandwidth capacity in a channel one or more cascading wireless communication links in a wireless communication cell, and manage the wireless communication bandwidth capacity in the channel across two or more virtual cells within the wireless communication cell.

20 Claims, 9 Drawing Sheets

U.S. PATENT DOCUMENTS

| | | | |
|---|---|---|---|
| 2003/0133457 A1* | 7/2003 | Ono et al. | 370/395.4 |
| 2004/0037223 A1* | 2/2004 | Harrison et al. | 370/235 |
| 2005/0113112 A1* | 5/2005 | Bolin et al. | 455/456.1 |
| 2006/0018276 A1* | 1/2006 | Kim et al. | 370/329 |
| 2006/0142021 A1* | 6/2006 | Mueckenheim et al. | 455/453 |
| 2007/0081507 A1* | 4/2007 | Koo et al. | 370/338 |
| 2007/0127378 A1* | 6/2007 | Yang et al. | 370/235 |
| 2007/0133500 A1* | 6/2007 | Rajkotia et al. | 370/348 |
| 2008/0031197 A1* | 2/2008 | Wang et al. | 370/331 |

OTHER PUBLICATIONS

Form PCT/ISA/210—International Search Report issued Jul. 15, 2008 in International Application No. PCT/US07/74865 (3 pages).

Korean Intellectual Property Office (KIPO) Notification of Preliminary Rejection mailed Oct. 27, 2010 in corresponding Korean Application No. 10-2009-7005579 (3 pages) (2 pages English Translation).

First Chinese Notification of Office Action mailed Oct. 13, 2010 in corresponding Chinese Patent Application No. 200780030650.9, (4 pages) (6 pages of English translation).

Korean Office Action issued Jun. 22, 2011 in corresponding Korean Patent Application 10-2009-7005579 (3 pages, 2 pages English translation).

* cited by examiner

RADIO RESOURCE MANAGEMENT IN MULTIHOP RELAY NETWORKS

CROSS-REFERENCE TO RELATED APPLICATION(S)

This application is related to and claims priority to U.S. provisional application entitled MANAGING A WIRELESS NETWORK having Ser. No. 60/822,861 filed Aug. 18, 2006 and related to and claims priority to U.S. provisional application No. 60/822,791 filed Aug. 18, 2006, all of which are incorporated by reference herein.

BACKGROUND

1. Field

The embodiments discussed herein are directed to radio resource management in multihop relay networks.

2. Description of the Related Art

In a wireless cellular network, users in different parts of a cell usually experience different signal qualities and thus different degrees of Quality of Service (QoS). This is because the channel quality of a user depends on many factors including path loss, shadowing and interference. Users at the cell edge often suffer strong interference from neighboring cells and observe lower Carrier to Interference-plus-Noise Ratio (CINR). In an urban environment, big buildings pose a serious blockage to users behind and sometimes generate coverage holes. Signal penetration and attenuation inside buildings or tunnels also degrade the signal quality significantly. Often it is not possible to improve the signal qualities to these under-serviced are by increasing the transmission power or changing the antenna configurations. Reducing the cell size and deploying more base stations will improve the situation, but this is often not possible due to limited access to traditional cell sites and wired backhaul links, and the associated high operating cost.

SUMMARY

It is an aspect of the embodiments discussed herein to provide efficient partitioning and assignment of radio resources (transmission time slots) among multiple wireless communication nodes, for example, among a base station (BS) and relay stations (RS) in a WiMAX Mobile Multi-hop Relay-Based network (MMR-cell).

The embodiments provide balancing wireless communication bandwidth capacity in a single channel cascading link(s) in a wireless communication cell and managing the wireless communication bandwidth capacity in the single channel across two or more virtual cells within the cell. The embodiments are not limited to a single channel, but according to an aspect of an embodiment, a plurality of channels may be among such nodes for which radio resource control parameters are specified and the alignment of frame structures are maintained by the relay resynchronization amble sequence.

These together with other aspects and advantages which will be subsequently apparent, reside in the details of construction and operation as more fully hereinafter described and claimed, reference being had to the accompanying drawings forming a part hereof wherein like numerals refer to like parts throughout.

DETAILED DESCRIPTION OF THE EMBODIMENTS

The embodiments relate to managing (e.g., assigning) radio resources to different wireless communication links in a wireless communication network, maximizing the user QoS and system (including one or more cells) capacity. The embodiments adjust radio resources among a first node and one or more relay second nodes to one or more third nodes, based upon congestion level(s) (average transmission queue length at wireless communication transmitters). Radio resource managing refers to controlling communication, assignment (allocation/partitioning or apportionment), initialization/configuration, reconfiguration, adjustment, maintenance, testing/simulation, etc. of a wireless resource and/or wireless communication using the wireless resource. According to an aspect of an embodiment, radio resources are managed (e.g., assigned) by a first node for digital relaying in-band, via one or more relay second devices, information between the first device and one or more third device(s) in a wireless communication network cell (referred to as cell cascading link load balancing). Channel assignment refers to assigning a portion of a radio resource used among nodes, for example, a portion of an in-band radio resource (a portion of a single channel). A single channel can refer to any radio resource including one or a plurality of bands providing a limited radio resource and targeted for use by nodes, and may be partitioned or apportioned according to the embodiments.

A radio resource refers to wireless communication bandwidth according to applicable wireless communication network access systems (specifications) for accessing the wireless communication network. Bandwidth can comprise segment, sub-carriers (if any), symbols, transmission power, time-slots, frequency, or portions thereof, or any combinations thereof. In-band refers to a single channel not requiring another frequency band by using the same frequency band among cascading wireless communication links among the first and the relay second device(s) to the one or more third device(s). According to an aspect of an embodiment, any device between two devices that performs digital baseband function(s) (i.e., performs applicable signal/data processing) can be a relay device. According to an aspect of an embodiment, the first node indirectly controls the one or more third nodes through one or more relay second nodes. According to another aspect of an embodiment, radio resources are managed (e.g., assigned) across two or more virtual cells within a wireless communication network cell (referred to a virtual cell—VC—load balancing). A virtual cell refers to one or more service areas within a cell, each service area covered by the first node or by a first node and one or more cascading relay second nodes. One embodiment provides any combination of cell cascading link load balancing and/or virtual cell load balancing.

The embodiments can be included in any wireless communication network using Time Division Duplex in a single channel. For example, the embodiments are not limited to but can be included in any Broadband Wireless Access Standards, such as (without limitation) IEEE 802.16 standards (also known as Worldwide Interoperability for Microwave Access (WiMAX) networks), and which at the MAC and/or physical layers specify various and/or combinations of wireless communication network access specifications based upon Time Division Duplex (TDD) systems, such as (without limitation) Time Division Multiple Access (TDMA), Code Division Multiple Access (CDMA) systems, orthogonal frequency division multiple access (OFDMA), and/or frequency division multiple access (FDMA).

In a wireless cellular network, using radio relays can be an effective way to increase the signal quality of the users by replacing a long, low quality communication link between a Base Station (BS) and a Mobile/Subscriber Station (MS/SS) (hereinafter referred to as MS) with multiple shorter, high quality links through one or multiple Relay Stations (RSs). As relay stations do not require their own wired backhauls, and are often less sophisticated than a full functional BS, relay stations are less expensive to deploy and operate than a traditional BS. A relay station could extend the service of the BS to coverage holes where users would otherwise not get services, and extend the effective cell size of a BS. A relay station could also be used to improve the Carrier to Interference-plus-Noise Ratio (CINR) and Quality of Service (QoS) of the users and enhance the cell capacity. A cell refers to a service coverage area of a BS (an area in which the BS manages all wireless communication nodes/devices in the area).

A relay technique can be by IEEE 802.16 standard, including in the 802.16j Relay working group. However; the embodiments are not limited to the IEEE 802.16j wireless relay communication network, and can be applied to other types of wireless relay communication networks. In IEEE 802.16j standard, a relay station communicates to the BS like a MS, and communicates with the MS in its coverage area (called RS-microcell) like a BS. The overall service coverage area of a BS and all the associated RSs can be called a Mobile Multi-hop Relay-Based Cell (MMR-cell or MMR network in case of one cell). There are three types of relay stations: fixed, nomadic and mobile RS. The first two types of RS are either fixed at a location permanently or for a time much longer than the typical session of a user. The embodiments relate to operations of fixed/nomadic RS. A mobile RS is typically installed on a moving vehicle and provides services to those MSs in the vehicle. According to an aspect of an embodiment, in an MMR-cell, including one or more fixed and/or nomadic RSs, capacity and/or QoS is/are maximized and/or optimized. According to another aspect of an embodiment, the MMR-cell RSs can include one or more mobile RSs, for which the embodiments might not manage capacity and/or QoS.

Figure 1:
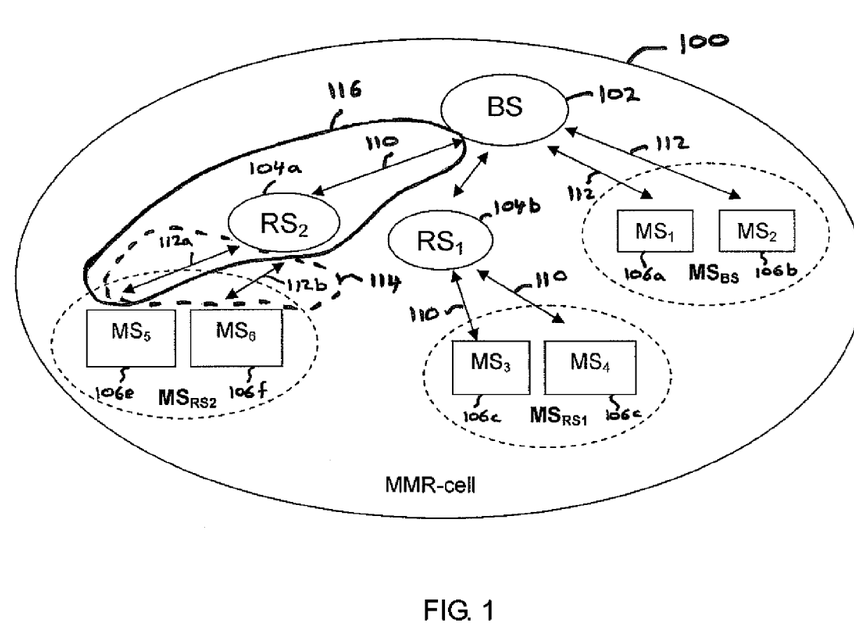
FIG. 1 is a diagram of a topology of a Mobile Multi-hop Relay-Based Cell (MMR-cell), according to an embodiment.

The embodiments apply to a wireless communication network with one or more sets of three or more wirelessly communicating nodes sharing a single channel. In one example embodiment, FIG. 1 is a diagram of a topology of an MMR-cell 100 with a BS 102 and two relay stations (RS1 and RS2) 104a, 104b. The BS 102 is serving the MSs$_{1-6}$ 106a-f in the set MS$_{BS}$ directly (MS$_1$ 106a and MS$_2$ 106b). Two relay stations (RS$_1$ 104a, RS$_2$ 104b) are used to extend the coverage of BS 102 and serve MSs$_{3-6}$ 106c-f in the set MS$_{RS1}$ (MS$_3$ 106C, MS$_4$ 106d) and MS$_{RS2}$ (MS$_5$ 106e, MS$_6$ 106f). The MMR-cell 100 includes the communication coverage area of the BS 102 and all the RSs 104. Uplink communication (UL) refers to communication from MS to RS to BS, and downlink communication (DL) refers to communication from BS to RS to MS.

In FIG. 1, a relay link 110 refers to a DL/UL wireless communication link between a BS 102 and an RS 104, including links among RSs 104 (as the case may be). An access link 112 refers to a DL/UL wireless communication link involving a MS 106 (between a BS 102 and an MS 106, or between the RS 104 and one MS 106). A composite access link 114 refers to a collection of access links 112a-n. A cascading DL/UL wireless communication link (cascading link) 116 refers to one or more relay links 110 and one access link 112 (in case of two or more access links 112, a composite link 114).

In a MMR network 100, bandwidth is often limited and has to be shared by a base station 102 and one or more relay stations 104 to serve all the MSs 106 in the MMR-cell 100. Sometimes a relay station 104 has a single radio interface to reduce the cost, which also mandates the RS 104 to use the same channel to communicate with the BS 102 and with the RSs' 104 MSs 106 (and potentially with other RSs 104). In a Time Division Duplex (TDD) system, the downlink subframe is used by BS 102 to transmit to MSS 106a-b, by the BS 102 to transmit to the RSs 104, and by the RSs 104 to transmit to their corresponding MS$_{RS}$ 106c-f. Similarly, the uplink subframe is used by the MS$_{BS}$ 106a-b to transmit to the BS 102, by MS$_{RS}$ 106c-f to transmit to their RS 104, and by the RSs 104 to transmit to the BS 102. How the bandwidth is assigned to a different portion of the MMR network 100 can have a profound impact on the MMR network 100 capacity and the degree of provided QoS and is an important issue.

Figure 2:
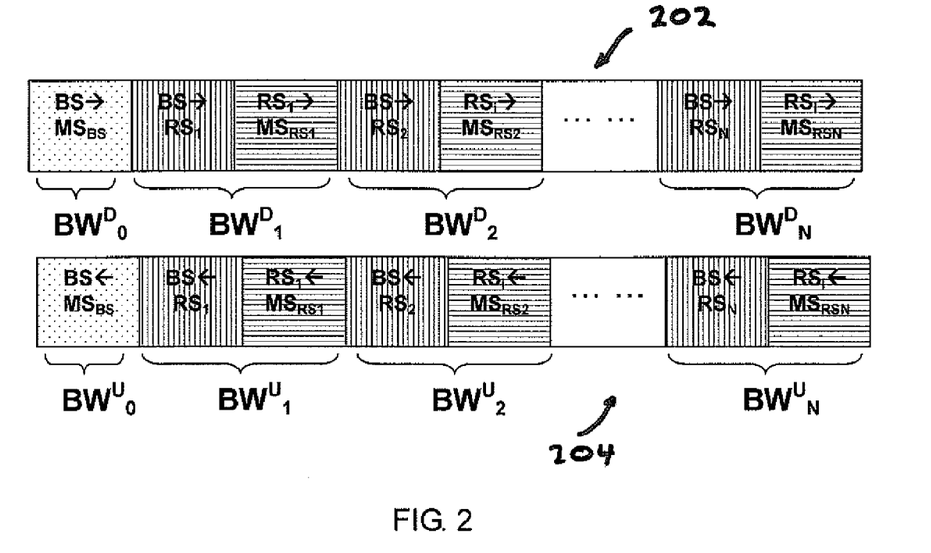
FIG. 2 is a diagram of a TDD frame structure in an MMR-cell, according to an embodiment.

FIG. 2 shows the TDD frame structure in an MMR 100, according to an embodiment. In FIG. 2, the TDD frame structure of an MMR cell 100 can be as follows: DL subframe (top) 202 and UL subframe (bottom) 204. BS 102 and N RSs 104 share the DL and UL subframes 202, 204 on a TDMA basis. The order of the medium access in a DL or UL subframe can be arbitrary and can be interchanged without affecting the embodiments. On the downlink, $BW^D_i$ includes all the bandwidth (BW) assigned to BS 102 and RS$_i$ 104 (possibly multiple RSs 104) for the traffic destined to MS$_{RSi}$ 106. On the uplink, $BW^U_i$ includes all the bandwidth assigned to RS$_i$ 104 (possibly multiple RSs 104) and to MS$_{RSi}$ 106 for the traffic generated by MS$_{RSi}$ 106.

In the DL subframe 202, different links (BS→MS$_{BS}$, BS→RS$_1$, RS$_1$→MS$_{RS1}$, . . . , BS→RS$_N$, RS$_N$→MS$_{RSN}$) share the bandwidth on a TDMA basis. Bandwidth is assumed not reused in the MMR cell 100, i.e. at any time the bandwidth is used only by a BS or a RS. The UL subframe 204 is similar to the DL subframe and is shared by multiple links (BS←MS$_{BS}$, BS←RS$_1$, RS$_1$←MS$_{RS1}$, . . . , BS←RS$_N$, RS$_N$←MS$_{RSN}$). Each RS 104 can generate its own transmission scheme on an access link 112 or composite links 114 (i.e., to/from RS$_i$ 104 associated MSs 106), given that the BS 102 assigns a portion of the DL/UL subframe 202, 204 for RS$_i$'s use. A RS 104 also handles, on the access/composite links 112, 114, the bandwidth request from its MSs 106, manages the flows to/from its MSs 106) and the retransmission request (ARQ and HARQ). From the viewpoint of a MS 106 serviced by a RS 104, the RS 104 functions like a regular BS 102.

The BS 102, on the access link 112 and RS link 110, respectively, generates its own transmission schedule to/from the MS 106 it serves directly (MS$_{BS}$) and the RSs 104. The BS 102 is also in charge of bandwidth partitioning in the DL and UL subframes 202, 204. The bandwidth partitioning function, or radio resource management, can be considered as the top layer of radio resource management in a MMR cell 100. The detailed scheduling algorithm (process/operations) at the BS 102 and the RS 104 is at the bottom of MMR radio resource management. Detailed scheduling refers to assigning particular radio resources (subcarriers/subchannels, portion(s) of one or portion(s) of a set of channels, symbols, CDMA code, or transmission power, or any combinations thereof) for transmission from a BS or a RS to a subordinate MS or RS in the downlink direction or reversely in the uplink direction. Although the link between $RS_i$ and its associated $MS_{RSi}$ actually includes many links, conceptually the top layer resource management function (bandwidth partitioning function) can treat the $RS_i$-$MS_{rsi}$ link as a composite link 114. The details of the scheduling algorithms running at the BS 102 and each $RS_i$ 104 can be transparent to the BS 102 bandwidth partitioning function. BS 102 assigns a fraction of the bandwidth for each BW portion in DL and UL subframe 202/204 based on the information the BS receives from all the RS 104. The role of the scheduling algorithm is reflected in the queue lengths at the BS/RS DL/UL transmitters, so the higher layer radio resource management scheme incorporate the results of these detailed scheduling algorithms without requiring detailed knowledge of their operations.

A two-layered radio resource management for a wireless communication network, such as (without limitation) MMR-cell 100, is provided. According to an aspect of an embodiment, the wireless communication bandwidth partitioning is managed in two steps and repeated iteratively on a periodic basis. Although the embodiments are not limited to such a configuration, and the two bandwidth partitioning management can be done in any combination of one, or the other, or both, and in any order. According to an aspect of an embodiment, the wireless communication bandwidth partitioning managers run in parallel, one for the downlink and one for the uplink, or any combinations thereof. As the time ratio of the UL subframe 202 and DL subframe 204 is a network-wide (e.g., a cell, or MMR-cell 100) parameter and should be only changed by the network operator, the duration of the UL and the DL subframes 202/204 can be considered fixed and the UL and DL bandwidth partitioning managers operate independent of each other. The DL and UL bandwidth partition manager operate in a similar manner.

Figure 3A:
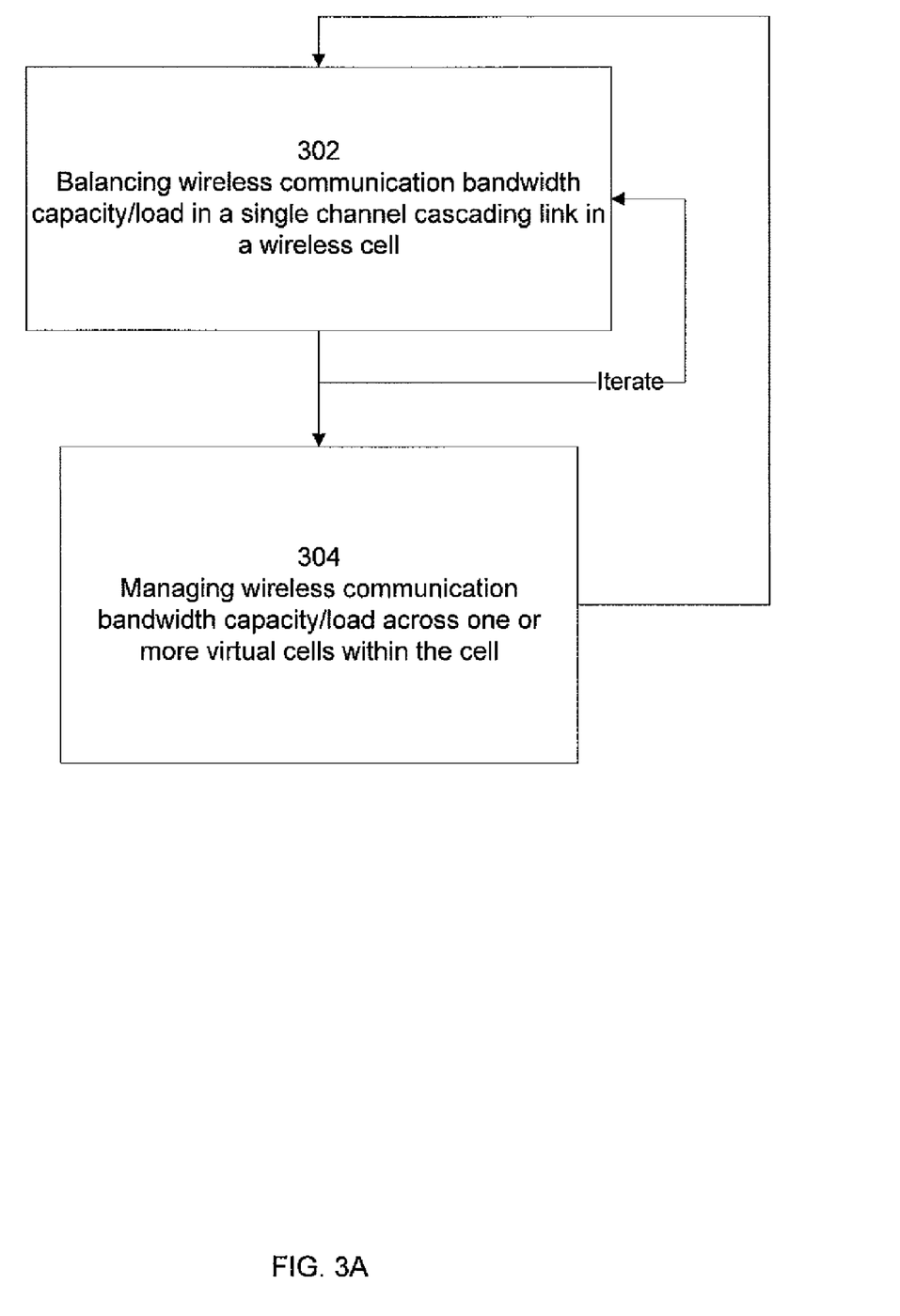
FIG. 3A is a flowchart of managing radio resources in a relaying wireless communication cell, according to an embodiment.

FIG. 3A is a flowchart of managing radio resources in a relaying wireless communication cell, according to an embodiment. At operation 302, link load balancing or cascading link 116 balancing is performed to balance the capacities of the links BS→$RS_i$, $RS_i$→$MS_{RSi}$ by adjusting the ratio between the bandwidths (can be fraction of DL transmission times) allocated to these links in the cascading link 116. Bandwidth is based upon a generic wireless communication network access specification. For example, for a TDMA-based system, bandwidth could mean the number of slots used in a frame. For example, for FDMA-based system, bandwidth could mean the size of the assigned bandwidth. For OFDMA based system like 802.16e, bandwidth means a two-dimensional (subcarriers by OFDM symbols) entity.

Note that the links BS→$RS_i$, $RS_i$→$MS_{RSi}$ are two hops of the downlink path from the BS 102 to the set of MS 106 served by $RS_i$ 104 ($MS_{RSi}$). The QoS of the users in $MS_{RSi}$ depends on the resource allocated to the two links of RS link 110 and composite link 116. Assume to the total bandwidth (fraction of DL subframe) assigned to the cascading link 116 (two links, BS→$RS_i$, $RS_i$→$MS_{RSi}$) is fixed and is $BW^D_i$.

According to an aspect of an embodiment, a portion of $BW^D_i$, $\alpha*BW^D_i$ (0<$\alpha$<1), is assigned to the RS link 110 (BS→$RS_i$), and the remaining (1-$\alpha$)*$BW^D_i$ is assigned to the (composite) link 114 $RS_i$→$MS_{RSi}$. Assume the capacities of the cascading link 116 (two links of an RS link 110 and an access link 112) are $C_{BS \to RSi}$ and $C_{RSi \to MSRSi}$ respectively). Here capacity is the transmission rate for a link when it is assigned all the resources $BW^D_i$. The RS link 110 BS→$RS_i$ is a point to point link and its capacity $C_{BS \to RSi}$ is a function of the channel quality from BS to $RS_i$. The link $RS_i$→$MS_{RSi}$ is typically a composite link 114 including many point to point links 112 ($RS_i$→$MS_k$, $MS_k$ ∈$MS_{RSi}$), and the capacity of $RS_i$→$MS_{RSi}$ is a function of the channel quality of all these links 112 or the composite link 114 as well as the scheduler running at $RS_i$. 104, which uses a radio resource (bandwidth) portion provided by the BS 102. The transmission rates (bits per second rate) of the cascading link 116 (two links of an RS link 110 17 and a composite link 114) can be expressed by Equation (1):

$$r_{BS \to RSi} = \alpha*C_{BS \to RSi}, \text{ and}$$

$$r_{RSi \to MSRSi} = (1-\alpha)*C_{RSi \to MSRSi}. \quad (1)$$

The type of QoS required by a user session varies from different types of traffic. For non-real-time user data sessions, like file down loading, QoS is measured by the throughput of the session Equation (2):

$$r_{BS \to MSRSi}(\alpha) = \min(r_{BS \to RSi}, r_{RSi \to MSRSi}) \quad (2)$$
$$= \min(\alpha^*C_{BS \to RSi}, (1-\alpha)^*c_{RSi \to MSRSi})$$

$r_{BS \to MSRSi}$ is maximized when $\alpha*C_{BS \to RSi}=(1-\alpha)*C_{RSi \to MSRSi}$, so the optimal $\alpha_D*$ for user data or non-real-time session $\alpha_D*$ can be by Equation (3)

$$\alpha_D* = C_{RSi \to MSRSi}/(C_{BS \to RSi} + C_{RSi \to MSRSi}) \quad (3)$$

Typically, non-realtime data can refer to data generally not having critical arrival or reception time constraints or requirements. In contrast, real-time data can refer to data having critical arrival or reception time constraints or requirements, such as voice, video, etc. For example, real-time sessions like VoIP, session QoS is measured by packet delay and drop rate. To optimize the bandwidth allocation satisfying mixed traffic types demanding different notion of QoS can be difficult. The schedulers at BS 102 and at RS 104 can deliver higher capacity, if the schedulers are allowed to mix various types of traffic in an aggregated bandwidth through higher multiplexing gain. As the channel from $RS_i$ to $MS_{RSi}$ are mobile channels with fast fading, L the capacity of the link $C_{RSi \to MSRSi}$ is time varying. Instead of using rate based link balancing, the embodiments are based on queue length, or any combination of rate-based and/or queue-based link balancing. A tandem queues refers to two transmission queues at a first/third node and the relay second node (e.g., BS/MS 102/106 and RS 104) in a communication link direction (DL or UL as the case may be) in a cascading link 116. Cascading transmission queue refers to two or more queues in a single channel cascading wireless communication link among a first node, one or more relay second nodes and one or more three nodes. Queue refers to a queue of data frames or packets to be wirelessly transmitted.

The embodiment adjusts the bandwidth allocated to the links of a cascading link 116 based on the queue lengths at the BS 102 and RS 104 (MS 106 and RS 104 for the uplink). Queue length or size is a number of packets waiting at a time t to be transmitted. For example, queue size at a transmitter (e.g., MS 106) can be a most readily observed variable and is sent in the bandwidth request messages by the MS 106 in the uplink direction. By Little's theorem, the queue size and the packet delay are directly related to each other. By controlling the queue length, the packet delay can be controlled at each hop and the end-to-end packet delay as well. By balancing the queue lengths (number of packets N at a transmitting node), for example, at BS and RS ($N_{BS}=N_{RS}$), effectively the transmission rate ($\mu$) can be balanced at BS and RS. So the resulting bandwidth allocation factor between BS→$RS_i$, $RS_i$→$MS_{Rsi}$ for various types of data can be determined by balancing the transmission queue length.

In FIG. 3A, operation 304 provides managing the wireless communication bandwidth capacity in the single channel across two or more virtual cells within the cell. According to an aspect of an embodiment, operations 302 and 304 can be repeated in any combination or order, according to desired application criteria. According to an aspect of an embodiment, operation 302 can iterate many times, for example, for a number of cascading links 116, before proceeding with operation 304.

Figure 3B:
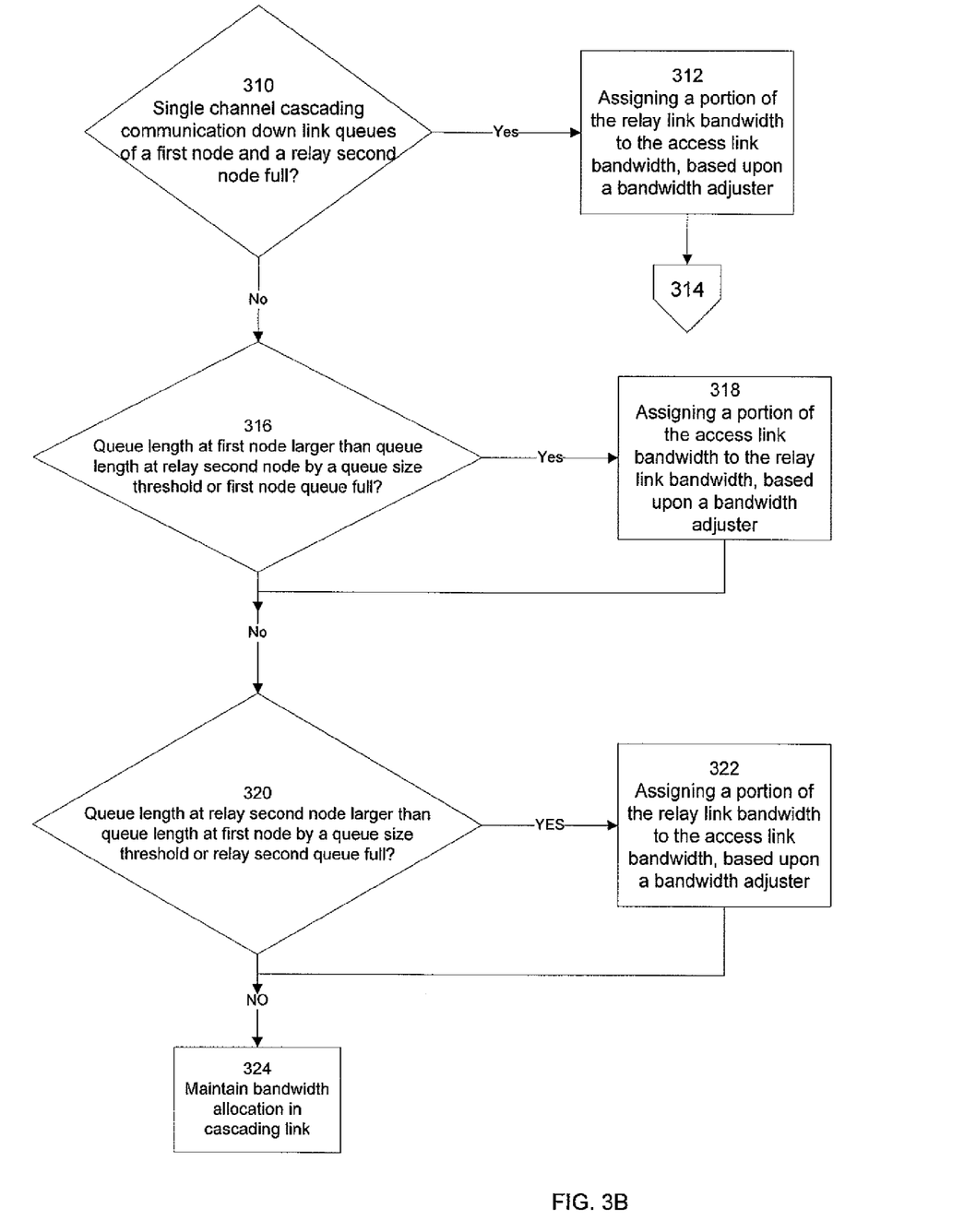
FIG. 3B is a flow chart of managing radio resources in a single channel cascading link, according to an embodiment.

FIG. 3B is a flow chart of managing radio resources in a single channel cascading link, according to an embodiment. More particularly, FIG. 3B is a flow chart of operation 302 balancing wireless communication bandwidth capacity in a single channel cascading down link in a wireless cell, according to an embodiment.

Let $BW^D_i$ be the total bandwidth assigned to links BS→$RS_i$ and $RS_i$→$MS_{Rsi}$ for downlink transmission from the BS to the set of MSs 106 serviced by $RS_i$. In one embodiment, $BW^D_i$ is assigned by cell load balancing algorithm and considered fixed at time t. Let the time averaged queue length at time t at BS (or $RS_i$) for traffic to $MS_{Rsi}$ be $Q^{BS}_i(t)$ (or $Q^{RSi}_i(t)$) bytes. Let $\Delta^D_{BW}=\delta_1 BW^D_i, 0<\delta_1<1$ be bandwidth adjustment step size. Suggested value of $\delta_1=0.05$, and this value can be further tuned with simulation or adjusted online dynamically. Let $\Delta^D_Q>0$ be a threshold for queue size difference in bytes. Periodically the bandwidth allocated to link BS→$RS_i$, $BW_{BS \to RSi}(t)$, and to link $RS_i$→$MS_{Rsi}$, $BW_{RSi \to MSRSi}(t)$, are updated as follows.

Figure 3C:
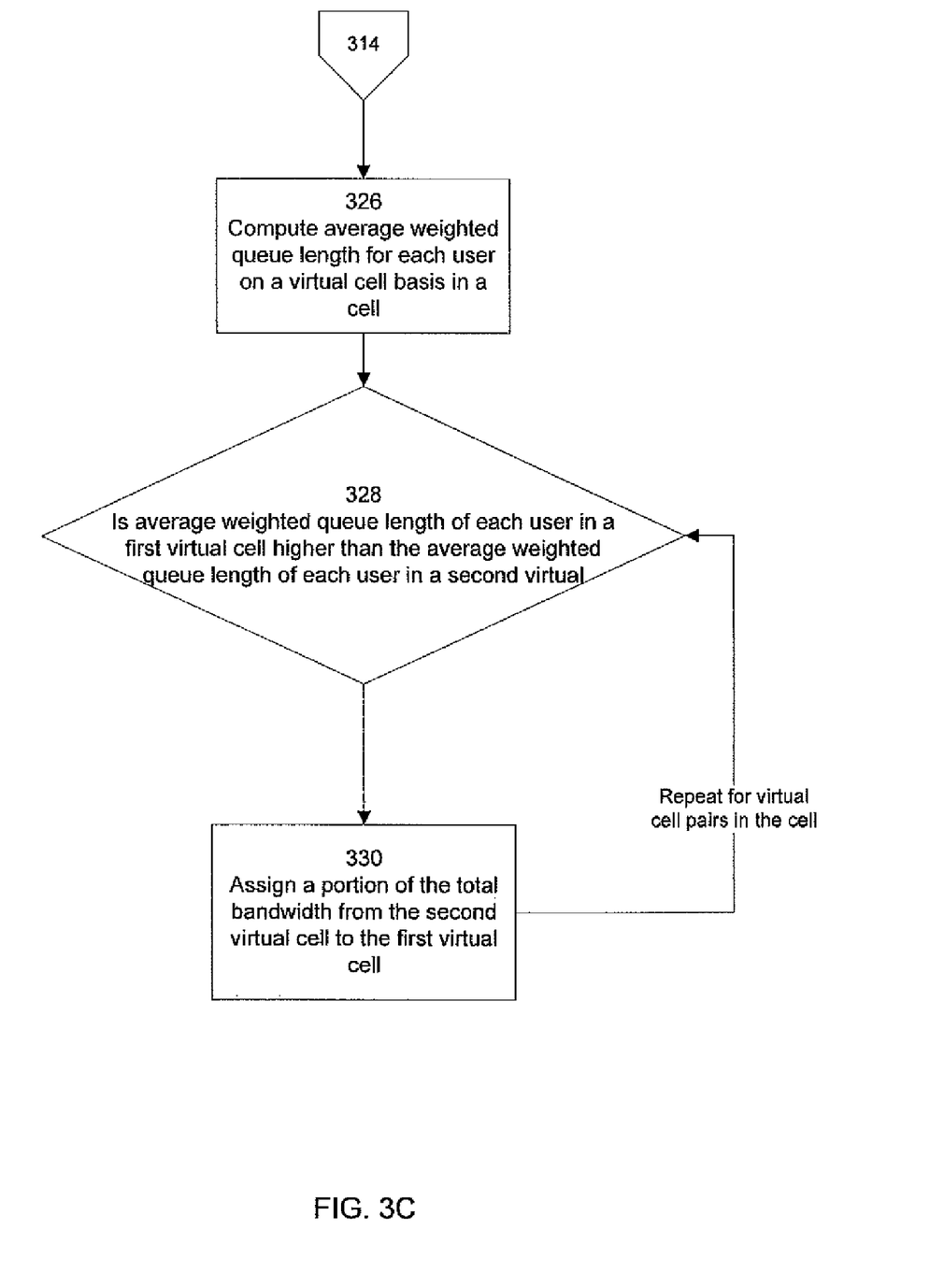
FIG. 3C is a flow chart of managing radio resources across virtual cells in a cell, according to an embodiment.

At operation 310, it is determined whether single channel cascading communication down link queues of a first node and a relay second node are full. If at operation 310, both the first node and relay second nodes are full, at operation 312, a portion of the relay link bandwidth is assigned to the access link bandwidth, based upon a bandwidth adjuster. According to an aspect of an embodiment, operation 312 assigns more bandwidth to a communication link closest to the final destination node, a benefit of which is allowing more queued packets delivered to the destination MS nodes. Operation 314 manages the wireless communication bandwidth capacity in the single channel across two or more virtual cells within the cell (FIG. 3C).

At operation 316, it is determined whether queue length at first node is larger than queue length at relay second node by a queue size threshold or first node queue is full. If a condition of operation 316 is met, at operation 318, a portion of the access link bandwidth is assigned to the relay link bandwidth, based upon a bandwidth adjuster. At operation 320, it is determined whether queue length at relay second node is larger than queue length at first node by a queue size threshold or relay second queue is full. If a condition of operation 320 is met, at operation 322, a portion of the relay link bandwidth is assigned to the access link bandwidth, based upon a bandwidth adjuster.

If none of the condition of operations 310, 316, and 320 are met, bandwidth allocation in the single channel cascading communication down link can be maintained. According to an aspect of an embodiment, after operation 324, virtual cell balancing can be performed at operation 314.

Figure 5:
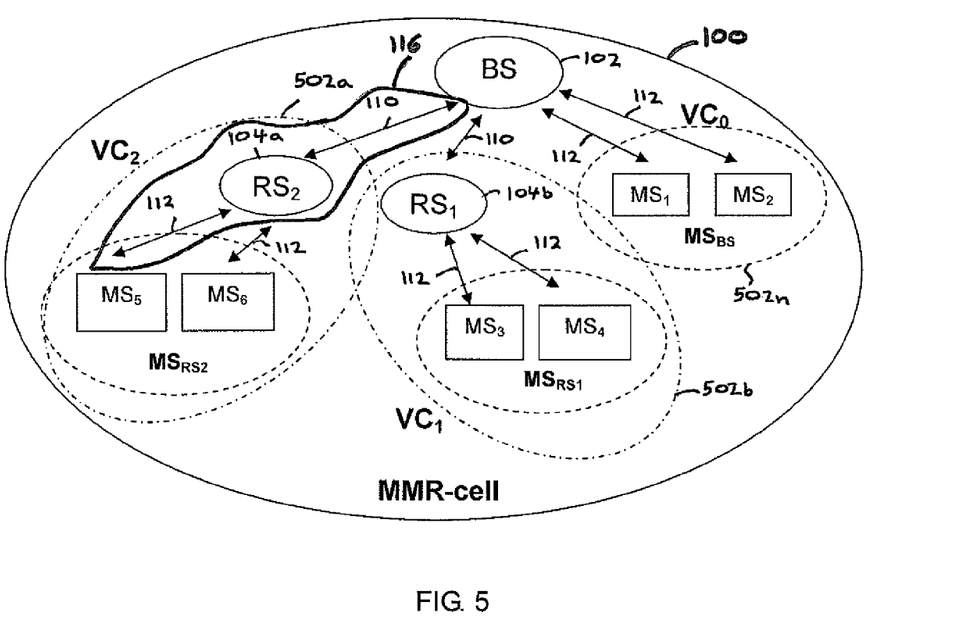
FIG. 5 is a diagram of a topology of an MMR-cell including virtual cells, according to an embodiment.

The flow chart of FIG. 3B can be expressed as follows:
If both $Q^{BS}_i(t)$ and $Q^{RSi}_i(t)$ are full (310), $$BW_{BS \to RSi}(t+1)=BW_{BS \to RSi}(t)-\Delta^D_{BW}, \text{ and}$$

$$BW_{RSi \to MSRSi}(t+1)=BW_{RSi \to MSRSi}(t)+\Delta^D_{BW}, (314)$$

and signal to the virtual cell load balancing (FIG. 3C) that the virtual microcell $RS_i$ 502 (FIG. 5) (served by link BS→$RS_i$→$MS_{Rsi}$) is over loaded in the downlink direction;

Else if $Q^{BS}_i(t)>Q^{RSi}_i(t)+\Delta^D_Q$, or $Q^{BS}_i(t)$ is full (316)

$$BW_{BS \to RSi}(t+1)=BW_{BS \to RSi}(t)+\Delta^D_{BW}, \text{ and}$$

$$BW_{RSi \to MSRSi}(t+1)=BW_{RSi \to MSRSi}(t)-\Delta^D_{BW}; (318).$$

Else if $Q^{RSi}_i(t)>Q^{BS}_i(t)+\Delta^D_Q$, or $Q^{RSi}_i(t)$ is full (320)

$$BW_{BS \to RSi}(t+1)=BW_{BS \to RSi}(t)-\Delta^D_{BW}, \text{ and}$$

$$BW_{RSi \to MSRSi}(t+1)=BW_{RSi \to MSRSi}(t)+\Delta^D_{BW}. (322)$$

Else $$BW_{BS \to RSi}(t+1)=BW_{BS \to RSi}(t), \text{ and}$$

$$BW_{RSi \to MSRSi}(t+1)=BW_{RSi \to MSRSi}(t) (324).$$

The queue sizes $Q^{BS}_{MSRSi}(t)$, $Q^{RSi}_{MSRSi}(t)$ are computed by averaging over the entire interval between t and t+1. When different types of traffic are presented, a weighted sum of different queues can be used with weight vector reflecting the importance of different traffic types.

The uplink link load balancing algorithm is similar to the downlink algorithm, but based upon congestion level at the relay second node(s) and the third node(s) as transmitter. For example, the uplink bandwidth assigned to links BS←$RS_i$ at time t is $BW_{BS \leftarrow RSi}(t)$, and to link $RS_i$←$MS_{Rsi}$ is $BW_{RSi \leftarrow MSRSi}(t)$. $BW_{BS \leftarrow RSi}(t)+BW_{RSi \leftarrow MSRSi}(t)=BW^U_i$ (assigned by the uplink virtual cell load balancing algorithm). The uplink queue size $UQ^{RSi}_i(t)$ is sum of the lengths of all the uplink queues from $RS_i$ to BS, and $UQ^{MSi}_i(t)$ is the sum of the lengths of all the uplink queues at all the MS in $MS_{Rsi}$. Let $\Delta^U_{BW}=\delta_2 BW^U_i$, $0<\delta_2<1$ be bandwidth adjustment step size for the uplink. $\Delta^U_Q>0$ is a threshold for uplink queue size differences in bytes. Periodically $BW_{BS \leftarrow RSi}(t)$ and $BW_{RSi \leftarrow MSRSi}(t)$ are updated as follows:

If both $UQ^{RSi}_i(t)$ and $UQ^{MSi}_i(t)$ are full, $$BW_{BS \leftarrow RSi}(t+1)=BW_{BS \leftarrow RSi}(t)+\Delta^U_{BW},$$

$$BW_{RSi \leftarrow MSRSi}(t+1)=BW_{RSi \leftarrow MSRSi}(t)-\Delta^U_{BW},$$

and signal to the load balancing (FIG. 3C) that the virtual microcell $RS_i$ 502 (FIG. 5) (served by links BS←$RS_i MS_{Rsi}$) is over loaded in the uplink direction;

Else if $UQ^{RSi}_i(t)>UQ^{MSi}_i(t)+\Delta^U_Q$, or $UQ^{RSi}_i(t)$ is full $$BW_{BS \leftarrow RSi}(t+1)=BW_{BS \leftarrow RSi}(t)+\Delta^U_{BW},$$

$$BW_{RSi \leftarrow MSRSi}(t+1)=BW_{RSi \leftarrow MSRSi}(t)-\Delta^U_{BW};$$

Else if $Q^{MSi}_i(t)>Q^{RS}_i(t)+\Delta^U_Q$, or $Q^{MSi}_i(t)$ is full (exceeds a threshold)

$$BW_{BS \leftarrow RSi}(t+1)=BW_{BS \leftarrow RSi}(t)-\Delta^U_{BW},$$

$$BW_{RSi \leftarrow MSRSi}(t+1)=BW_{RSi \leftarrow MSRSi}(t)+\Delta^U_{BW}.$$

Else $$BW_{BS \leftarrow RSi}(t+1) = BW_{BS \leftarrow RSi}(t),$$

$$BW_{RSi \leftarrow MSRSi}(t+1) = BW_{RSi \leftarrow MSRSi}(t).$$

The queue sizes $Q^{BS}_{MSRSi}(t)$, $Q^{RSi}_{MSRSi}(t)$ are computed by averaging over the entire interval between t and t+1. A weighted sum of queue lengths of different types can be used when multiple types of traffics are present in the uplink.

Figure 4:
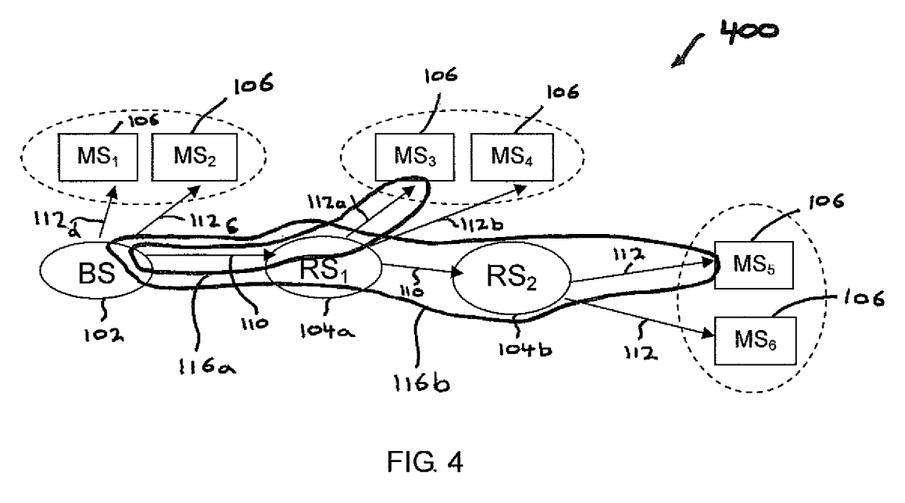
FIG. 4 is a diagram of a topology of an MMR-cell with 3 hops, according to an embodiment.

FIG. 4 is a diagram of a topology of an MMR-cell with 3 hops, according to an embodiment. The embodiment cascading link 116 load balancing can be extended beyond two hops as in FIG. 4. The embodiment applies to a network 400 with topology having a tree shape and/or a mesh shape, provided that in the latter case no dynamic load balancing is used. The embodiment 2-hop cascading link 116 load balancing can be applied iteratively, with each RS reporting the average queue length of all the hops in the direction away from the BS to its next hop towards the BS, and manages the bandwidth partitioning between its immediate link and the links beyond the immediate link (which is considered as a hypothetical composite link).

FIG. 3C is a flow chart of managing radio resources across virtual cells in a cell, according to an embodiment. In one example embodiment, FIG. 5 is a diagram of a topology of an MMR-cell including virtual cells, according to an embodiment. In FIG. 5, a MMR cell 100 with 3 virtual cells 502. $VC_0$ 502n includes all the MSs served directly by BS ($MS_1$ and $MS_2$). $VC_1$ 502b includes $RS_1$ and all the MSs served by $RS_1$ ($MS_3$ and $MS_4$). $VC_2$ 502a includes $RS_2$ and all the MSs served by $RS_2$ ($MS_5$ and $MS_6$). The virtual cell load balancing algorithm can be built on top of the link load balancing algorithm running on the route between the BS and the MS served by a RS (or the BS). It is designed to provide an even grade (e.g., might be weighted by factors like the average link quality in a micro-cell or number of MSs) of QoS in all the virtual RS-microcells 502 in the MMR coverage area. With the link load balancing, each BS-RS(-RS- ... RS)-MS service set can be viewed as a virtual microcell 502a-n connected and serviced directly by the BS.

For a virtual cell i, $[BW^D_i, BW^U_i, Q^D_i, Q^U_i, H_i, N_i]$ is the total bandwidth assigned in the downlink, the total bandwidth assigned in the uplink, the average queue length per user in the downlink direction at the BS for all the MS in the virtual cell, the average queue length per user in the uplink direction at the MS in the cell, the number of hops and the number of MSs. According to an aspect of an embodiment, the number of hops and the number of MSs can be optional. The microcell load balancing algorithm operates periodically. Because the DL algorithm and the UL algorithm are identical, the DL algorithm is described.

At operation 326, compute the average weighted queue length per user for all users in the MMR cell by Equation (4):

$$[Q^D_w] = \frac{1}{\sum_i w^i N^i} \sum_i w^i N^i Q^D_i \quad (4)$$

$w^i$ is a weight factor for virtual microcell i which could reflect the number of hops $H_i$, average channel quality in the virtual microcell, user service agreement condition, and other factors. Let $\Delta^{CD}_Q > 0$ be a threshold in queue length in bytes. At operation 328, for each pairs of F micro-cells (i,j) it is determined whether $w^i Q^D_i > [Q^D_w] + \Delta^{CD}_Q$, $w^i Q^D_j < [Q^D_w] -$ $\Delta^{CD}_Q$. At operation 330, a portion of the total bandwidth from the second virtual cell is assigned to the first virtual cell as follows:

$$BW^D_i(t+1) = BW^D_i(t+1) + \Delta^{CD}_{BW}, \text{ and}$$

$$BW^D_j(t+1) = BW^D_j(t+1) - \Delta^{CD}_{BW}.$$

The corresponding uplink algorithm replaces all the subscript $D$ with $U$. Measures can be taken to prevent ping-pong effect where bandwidth is assigned to different micro-cells back and forth. Like the link load balancing algorithm, the cell load balancing algorithm also uses queue size as an indication of QoS in different cells. However, there is a key difference between the two algorithms. For the link load balancing algorithm, cascading links are serving a same set of MSs. Therefore the traffic types, rates and QoS requirements at different hops are the same. The link load balancing algorithm tries to balance the QoS on different hops for the same set of user sessions. As the throughput rate and the packet delay are convex functions of the bandwidth allocation, the link load balancing algorithm maximizes the QoS to the MSs. On the other hand, the microcell load balancing algorithm deals with QoS in different microcells, possibly with different number of MSs, different number of hops different traffic sessions and QoS requirements, and different channel qualities. One benefit of controlling the bandwidth allocation in different microcells based on the queue length is that when link load balancing algorithm is running at different links in a virtual cell, queue length. is a good indication of the QoS in each cell. By balancing the queue length, a relatively uniform degree of QoS can be provided in the entire MMR-cell. Weight factor $w^i$ can take into account any special network related consideration/criteria, such as data type, user service agreement, network conditions other than congestion level, etc., and optimize the algorithm in the preferred direction.

For both the link balancing algorithm and the virtual-cell load balancing algorithm, the decision on how much resources to be assigned to each link is made by the BS. For this it needs to collect the queue status information on both the UL and the DL from the RSs. The RS can perform all the required processing (like averaging and summation) and send these queue length information to the BS through some TLV messages. As the BS updates the resource assignment based on these information, the BS incorporates its decision on resource assignment messages and sends them to the RS as a multicast message.

It is necessary to point out that the embodiment two-layered scheme for radio resource management is at the higher level of radio resource management by specifying how much of the radio resource can be used for each part of the MMR networks, i.e. BS→MS, BS→RS, RS→MS, BS←MS, BS←RS, RS←MS, etc. How these assigned radio resources are used by each link (or set of links) is determined by the scheduling algorithm at the BS and the RSs, which is the bottom level of radio resource management.

Figure 6:
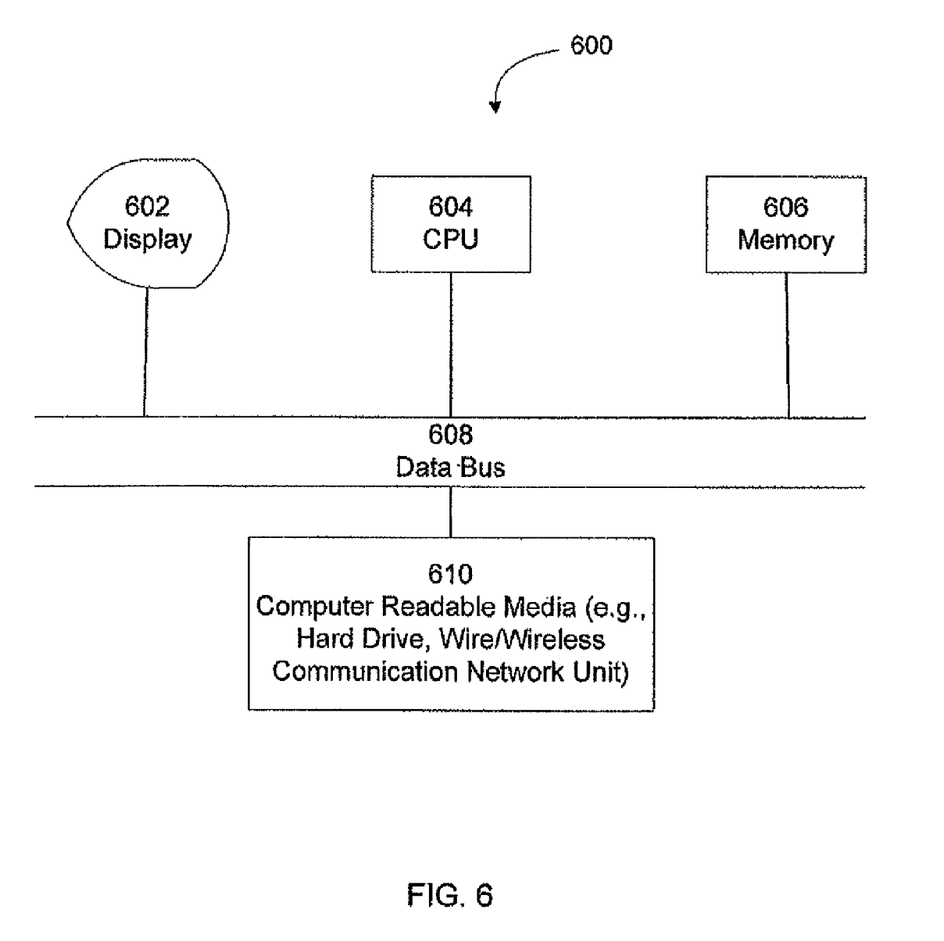
FIG. 6 is a functional block diagram of apparatus managing radio resources in a single wireless communication channel among nodes, according to an embodiment.

FIG. 6 is a functional block diagram of apparatus managing radio resources in a single wireless communication channel among nodes, according to an embodiment. In FIG. 6, the apparatus 600 can be any computing device wirelessly communicating with other devices, for example, (without limitation) functioning or operating as a Base Station 102 and/or Relay Station 104 and balancing wireless communication bandwidth capacity according to the embodiments. The apparatus 600 may include a display 602 to display a user interface or an interface (e.g., Internet) to connect to an external display device. A controller 604 (e.g., a central processing unit) executes instructions (e.g., a computer program or software)

that control the apparatus to perform baseband operations. Typically, a memory 606 stores the instructions for execution by the controller 604. According to an aspect of an embodiment, the apparatus is in communication with any computer readable media 610, such as (without limitation) physical computer readable recording media (e.g., a hard drive, memory), or wire/wireless communication network unit(s) implemented in software and/or computing hardware communicating via wire/wireless carrier wave signals. According to an aspect of an embodiment, the apparatus 600 is in wireless communication with a target wireless communication network, such as (without limitation) MMR-cell 100. The display 602, the CPU 604, the memory 604 and the computer readable media 610 are in communication by the data bus 608.

Figure 7:
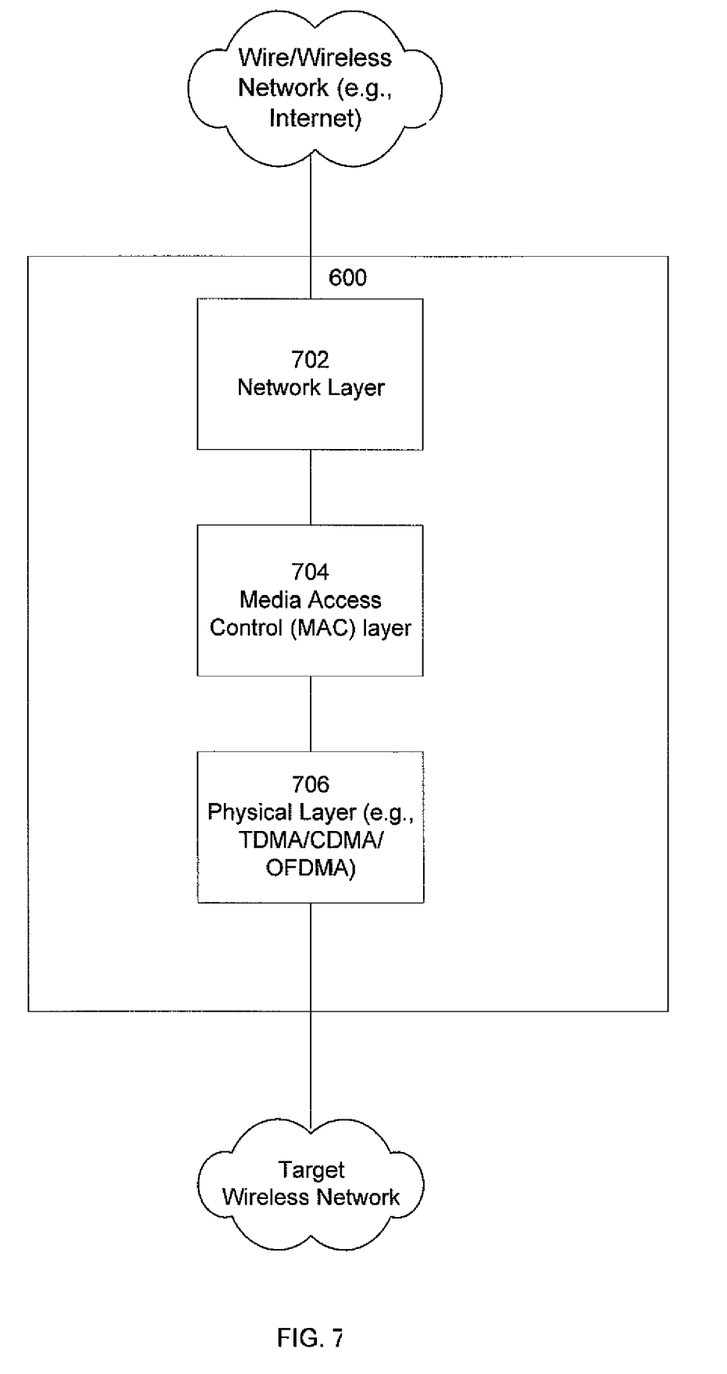
FIG. 7 is a functional diagram of processing layers (software and/or computing hardware) in the apparatus of FIG. 6, according to an embodiment.

FIG. 7 is a functional diagram of processing layers (software and/or computing hardware) in the apparatus of FIG. 6, according to an embodiment. In FIG. 7, the processing layers comprise a network layer 702, a Media Access Control (MAC) layer 704 and a physical layer 706. FIG. 7 processing layers are logical layers, and the embodiments are not limited to these example processing layers and other processing layer configurations may be provided. According to an aspect of an embodiment, the network layer 702 is software executed by the controller 704. The MAC 704 and physical layers 706 are software and/or computing hardware included as computer readable media in the wireless communication network unit 610. The MAC layer 704 and physical layer 706 implement various target wireless network access specifications, such as (without limitation) TDD, FDD and/or CDM. A target wireless network example can be the MMR-cell 100. The embodiments can be software (as stored or encoded on any known computer readable media 610, such as computer readable recording media, without limitation, a compact disk, a Digital Versatile Disc (DVD), memory, or communication media of carrier wave or electro-magnetic signals, etc.) and/or on any computing hardware. In one embodiment, the radio resource partitioning according to the embodiments is in the MAC layer 704 and/or the physical layer 706 specification of target wireless network nodes, for example, in a base station (BS) 102. Typically (without limitation) the network layer 702 provides wire and/or wireless communication access to private/public network(s) (e.g., Internet) other than the target wireless network. The network layer 403 can be used for management functions, such as dynamically (real-time) (e.g., for example, according to various criteria) provide (download) the configuration/control parameters, such as weight factors, for the embodiment radio resource partitioning.

The management of radio resources in multihop relay networks is different than that in a regular single hop cellular networks or mesh networks. Compared with schemes that assign fixed amount of radio resource for the BS and the RSs, the proposed scheme can adjust to different number of users in the MMR cell and their distributions, different amount of traffic and their required QoS, and different channel conditions. It is also generic and works with different types of scheduling schemes at the BS and the RS. Its operation is simple and can be implemented with low processing power and overhead.

The embodiments described provide the relay second node having a single radio interface, for example, to reduce cost, which also mandates the relay second node to use the same channel to communicate with the first node and with the third node(s) served or serviced by the relay second node, however, the embodiments are not limited to such a configuration and can be provided in a wireless communication cell in which one or more of the relay second nodes communicate over a single channel, but other relay second nodes might communicate over a plurality of channels. According to an aspect of an embodiment, in such a mixed single channel or multi channel relay second node cell, one or more of the single channel relay second nodes may be targets of radio resource management.

Mobile multihop relay networks (MMR) use relay stations to extend or enhance the coverage of a base station in a cellular network. While the base station is attached to a wired backhaul, the relay stations use wireless transmission to connect to the base station and to the mobile stations. If a relay station has a single radio interface, or the MMR network has to operate in a single channel, how to share the channel and allocate proper amount of bandwidth to the base station (BS), relay stations (MSs) and the mobile stations (MSs) is an important issue. The embodiments provide a simple and efficient method/apparatus of radio resource management in a single channel in MMR networks. It adopts a two-layer structure where the bandwidths assigned to cascading links are first balanced between multiple hops (link load balancing algorithm) based on transmission queue length, followed by the micro-cell load balancing which adjusts the bandwidths assigned to multiple virtual cells. The bandwidth adjustments are based on queue length at various nodes and is applicable to different types of packet (various types of data) scheduled by the various nodes of BS, RS and/or MS.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method, comprising:
managing wireless communication bandwidth capacity in a single channel of one or more cascading wireless communication links in a wireless communication cell, a cascading wireless communication link being a wireless communication link among a first node and one or more relay second nodes to one or more third nodes, and a wireless communication link between the first node and the relay second node being a relay link and a wireless communication link between the relay second node and a third node being an access link; and
managing the wireless communication bandwidth capacity in the single channel across two or more virtual cells within the wireless communication cell, each virtual cell being a service area of a relay second node and one or more third nodes,
wherein the managing of the wireless communication bandwidth capacity includes adjusting the bandwidth in a cascading wireless communication link among a relay link and/or an access link of the cascading wireless communication link and across two or more virtual cells, based upon a transmission congestion level according to average transmission queue lengths over a time interval at any combination of the nodes in the cascading wireless communication link and/or in the virtual cells.

2. The method of claim 1, wherein the cascading wireless communication link comprises a composite link of a plurality of wireless communication access links between the relay second node and the third nodes.

3. The method of claim 1, wherein the adjusting of the bandwidth further comprises adjusting the bandwidth in a downlink communication among the first node and the relay second node to the third nodes by periodically executing one or more of:
assigning a portion of the relay link bandwidth to the access link bandwidth, based upon a bandwidth adjuster, upon determining whether transmission queues of the first node and the relay second node are full, as a first bandwidth adjustment;
assigning a portion of the access link bandwidth to the relay link bandwidth, based upon the bandwidth adjuster, upon determining the transmission queue length of the first node is larger than the transmission queue length of the relay second node by a transmission queue size threshold or the first node transmission queue is full, as a second bandwidth adjustment; and/or
assigning a portion of the relay link bandwidth to the access link bandwidth, based upon the bandwidth adjuster, upon determining the transmission queue length of the relay second node is larger than the transmission queue length of the first node by the transmission queue size threshold or the relay second node transmission queue is full, as third bandwidth adjustment.

4. The method of claim 3, wherein the bandwidth adjuster varies by any combination for the first, second, third bandwidth adjustments and is dynamically input according to one or more of real-time wireless communication network conditions, user, or application.

5. The method of claim 1, wherein the adjusting of the bandwidth further comprises adjusting the bandwidth in an uplink communication among the first node and the second relay node to the third nodes by periodically executing one or more of:
assigning a portion of the relay link bandwidth to the access link bandwidth, based upon a bandwidth adjuster, upon determining transmission queues of the third node and the relay second node are full, as a first bandwidth adjustment;
assigning a portion of the access link bandwidth to the relay link bandwidth, based upon the bandwidth adjuster, upon determining the transmission queue length of the relay second node is larger than the transmission queue length of the third node by a transmission queue size threshold or the relay second node transmission queue is full, as a second bandwidth adjustment; and/or
assigning a portion of the relay link bandwidth to the access link bandwidth, based upon the bandwidth adjuster, upon determining the transmission queue length of the third node is larger than the transmission queue length of the relay second node by the transmission queue size threshold or the third node transmission queue is full, as third bandwidth adjustment.

6. The method of claim 1, wherein the average transmission queue length is based upon a weight according to various types of data traffic including non-realtime data and/or real-time data types.

7. The method of claim 1, wherein the adjusting of the bandwidth in the single channel across the two or more virtual cells comprises:
computing average weighted transmission queue length for each user on a virtual cell basis in a communication link direction;
for the communication link direction, determining whether an average weighted queue length of each user in a first virtual cell is higher than an average weighted queue length of each user in a second virtual; and
assigning a portion of a total bandwidth in the communication link direction of the second virtual cell to the first virtual cell, according to the determining.

8. The method of claim 7, wherein a weight factor for the weighted transmission queue length is a number of relay second nodes, user service agreement, or average channel quality, or any combinations thereof in a virtual cell.

9. The method according to claim 1, wherein the wireless communication cell is a Mobile Multi-hop Relay-Based Cell (MMR-cell) according to IEEE 802.16j.

10. The method of claim 1, the relay second nodes and/or the third nodes transmit the transmission congestion level to the first node by control messages and the first node performs the managing of the wireless communication bandwidth capacity by transmitting wireless bandwidth capacity control messages to the relay second nodes and/or the third nodes.

11. An apparatus, comprising:
a controller configured to:
manage wireless communication bandwidth capacity in a single channel of one or more cascading wireless communication links in a wireless communication cell, a cascading wireless communication link being a wireless communication link among a first node and one or more relay second nodes to one or more third nodes, and a wireless communication link between the first node and the relay second node being a relay link and a wireless communication link between the relay second node and a third node being an access link; and
manage the wireless communication bandwidth capacity in the single channel across two or more virtual cells within the wireless communication cell, each virtual cell being a service area of a relay second node and one or more third nodes,
wherein the managing of the wireless communication bandwidth capacity includes adjusting by the controller the bandwidth in a cascading wireless communication link among a relay link and/or an access link of the cascading wireless communication link and across two or more virtual cells, based upon a transmission congestion level according to average transmission queue lengths over a time interval at any combination of the nodes in the cascading wireless communication link and/or in the virtual cells.

12. The apparatus of claim 11, wherein the cascading wireless communication link comprises a composite link of a plurality of wireless communication access links between the relay second node and the third nodes.

13. The apparatus of claim 11, wherein the controller further adjusts the bandwidth in a downlink communication among the first node and the relay second node to the third nodes by periodically executing one or more of:
assigning a portion of the relay link bandwidth to the access link bandwidth, based upon a bandwidth adjuster, upon determining whether transmission queues of the first node and the relay second node are full, as a first bandwidth adjustment;
assigning a portion of the access link bandwidth to the relay link bandwidth, based upon the bandwidth adjuster, upon determining the transmission queue length of the first node is larger than the transmission queue length of the relay second node by a transmission queue size threshold or the first node transmission queue is full, as a second bandwidth adjustment; and/or assigning a portion of the relay link bandwidth to the access link bandwidth, based upon the bandwidth adjuster, upon determining the transmission queue length of the relay second node is larger than the transmission queue length of the first node by the transmission queue size threshold or the relay second node transmission queue is full, as third bandwidth adjustment.

14. The apparatus of claim 13, wherein the bandwidth adjuster varies by any combination for the first, second, third bandwidth adjustments and is dynamically input according to one or more of real-time wireless communication network conditions, user, or application.

15. The apparatus of claim 11, wherein the controller further adjusts the bandwidth in an uplink communication among the first node and the relay second node to the third nodes by periodically executing one or more of:

assigning a portion of the relay link bandwidth to the access link bandwidth, based upon a bandwidth adjuster, upon determining transmission queues of the third node and the relay second node are full, as a first bandwidth adjustment;

assigning a portion of the access link bandwidth to the relay link bandwidth, based upon the bandwidth adjuster, upon determining the transmission queue length of the relay second node is larger than the transmission queue length of the third node by a transmission queue size threshold or the relay second node transmission queue is full, as a second bandwidth adjustment; and/or assigning a portion of the relay link bandwidth to the access link bandwidth, based upon the bandwidth adjuster, upon determining the transmission queue length of the third node is larger than the transmission queue length of the relay second node by the transmission queue size threshold or the third node transmission queue is full, as third bandwidth adjustment.

16. The apparatus of claim 11, wherein the average transmission queue length is based upon a weight according to various types of data traffic including non-realtime data and/or real-time data types.

17. The apparatus of claim 11, wherein the adjusting of the bandwidth in the single channel across the two or more virtual cells comprises:

computing average weighted transmission queue length for each user on a virtual cell basis in a communication link direction;

for the communication link direction, determining whether an average weighted queue length of each user in a first virtual cell is higher than an average weighted queue length of each user in a second virtual; and assigning a portion of a total bandwidth in the communication link direction of the second virtual cell to the first virtual cell, according to the determining.

18. The apparatus of claim 17, wherein a weight factor for the weighted transmission queue length is a number of relay second nodes, user service agreement, or average channel quality, or any combinations thereof in a virtual cell.

19. The apparatus of claim 11, wherein the wireless communication cell is a Mobile Multi-hop Relay-Based Cell (MMR-cell) according to IEEE 802.16j.

20. The apparatus of claim 11, wherein the relay second nodes and/or the third nodes transmit the transmission congestion level to the first node by control messages and the first node performs the managing of the wireless communication bandwidth capacity by transmitting wireless bandwidth capacity control messages to the relay second nodes and/or the third nodes.

* * * * *

UNITED STATES PATENT AND TRADEMARK OFFICE
CERTIFICATE OF CORRECTION

| | | |
|---|---|---|
| PATENT NO. | : 8,032,146 B2 | Page 1 of 1 |
| APPLICATION NO. | : 11/830935 | |
| DATED | : October 4, 2011 | |
| INVENTOR(S) | : Chenxi Zhu et al. | |

It is certified that error appears in the above-identified patent and that said Letters Patent is hereby corrected as shown below:

Column 13, Line 33, in Claim 5, delete "second relay" and insert -- relay second --, therefor.

Signed and Sealed this
Twenty-first Day of February, 2012

David J. Kappos
*Director of the United States Patent and Trademark Office*